(12) United States Patent
Barral (10) Patent No.: US 9,587,675 B2
(45) Date of Patent: Mar. 7, 2017

(54) BEARING SHELL WITH ALIGNMENT PROJECTING FEATURE

(71) Applicants: Mahle International GmbH, Stuttgart (DE); Mahle Engine Systems UK Ltd., Warwickshire (GB); Mahle Composants Moteur France SAS, Chavanod (FR)

(72) Inventor: Stephane Barral, Chavanod (FR)

(73) Assignees: Mahle International GmbH (DE); Mahle Engine Systems UK Limited (GB); Mahle Composant Moteu France SAS (FR)

( * ) Notice: Subject to any disclaimer, the term of this patent is extended or adjusted under 35 U.S.C. 154(b) by 0 days.

(21) Appl. No.: 14/647,124

(22) PCT Filed: Nov. 19, 2013

(86) PCT No.: PCT/GB2013/053050
§ 371 (c)(1),
(2) Date: May 25, 2015

(87) PCT Pub. No.: WO2014/080194
PCT Pub. Date: May 30, 2014

(65) Prior Publication Data
US 2015/0292556 A1  Oct. 15, 2015

(30) Foreign Application Priority Data
Nov. 26, 2012 (GB) .................................. 1221213.0

(51) Int. Cl.
*F16C 9/02* (2006.01)
*F16C 33/02* (2006.01)
(Continued)

(52) U.S. Cl.
CPC .............. *F16C 33/06* (2013.01); *B21D 22/02* (2013.01); *B21D 28/02* (2013.01); *F16C 17/022* (2013.01);
(Continued)

(58) Field of Classification Search
CPC ...... F16C 17/022; F16C 33/046; F16C 33/08; F16C 35/02; F16C 43/02
(Continued)

(56) References Cited

U.S. PATENT DOCUMENTS

| 2,124,060 | A | * | 7/1938 | Gilman | ...................... F16C 9/00 |
| | | | | | 29/898.058 |
| 3,274,815 | A | * | 9/1966 | Roemer | .................... B21K 1/06 |
| | | | | | 29/898.066 |

(Continued)

FOREIGN PATENT DOCUMENTS

| DE | 675607 C | 5/1939 |
| DE | 10362115 B4 | 10/2007 |
| GB | 478918 A | * 1/1938 | ............ F16C 17/022 |

OTHER PUBLICATIONS

English abstract provided for DE-10362115.

*Primary Examiner* — Phillip A Johnson
(74) *Attorney, Agent, or Firm* — Fishman Stewart PLLC (57) ABSTRACT

A bearing shell for a sliding bearing may include a body having a convex outer surface and an alignment feature projecting from the outer surface. The alignment feature may be arranged at an end face of the body. The alignment feature may include a first tapered portion having an axial width that reduces in a direction away from the end face. The first tapered portion may include at least two axial sides extending circumferentially and angled away from parallel with respect to a corresponding axial end face of the body by an angle of 2° to 10°.

20 Claims, 9 Drawing Sheets (51) Int. Cl.
| | |
|---|---|
| *F16C 33/06* | (2006.01) |
| *F16C 43/02* | (2006.01) |
| *F16C 17/02* | (2006.01) |
| *F16C 33/04* | (2006.01) |
| *F16C 33/08* | (2006.01) |
| *B21D 22/02* | (2006.01) |
| *B21D 28/02* | (2006.01) |
| *F16C 33/14* | (2006.01) |

(52) U.S. Cl.
 CPC ............ *F16C 33/046* (2013.01); *F16C 33/08* (2013.01); *F16C 33/14* (2013.01); *F16C 43/02* (2013.01)

(58) Field of Classification Search
 USPC ....... 384/294–296, 429, 430, 432, 433, 434; 29/898.054, 898.057
 See application file for complete search history.

(56) References Cited

U.S. PATENT DOCUMENTS

| | | | |
|---|---|---|---|
| 5,169,244 A | 12/1992 | Siebert et al. | |
| 5,199,170 A * | 4/1993 | Mori | F16C 9/00 29/898 |
| 5,727,885 A | 3/1998 | Ono et al. | |
| 6,227,709 B1 * | 5/2001 | Lehmann | F16C 9/04 384/294 |
| 6,280,091 B1 * | 8/2001 | Martin | F16C 9/02 29/898.047 |
| 2005/0244087 A1 * | 11/2005 | Schrufer | F16C 9/04 384/294 |
| 2012/0027328 A1 | 2/2012 | Inagaki et al. | |

\* cited by examiner

BEARING SHELL WITH ALIGNMENT PROJECTING FEATURE

CROSS-REFERENCE TO RELATED APPLICATIONS

This application claims priority to British Patent Application No. 1221213.0, filed Nov. 26, 2012, and International Patent Application No. PCT/GB2013/053050, filed Nov. 19, 2013, both of which are hereby incorporated by reference in their entirety.

TECHNICAL FIELD

The present invention relates to bearing shells for sliding bearings, particularly bearing shells for engine crankshaft bearing assemblies.

BACKGROUND

Engine bearing assemblies, such as crankshaft main bearings and connecting rod bearings, commonly comprise a pair of lined housings holding a rotatable shaft, with each housing being lined with a bearing shell. Each housing has a generally semi-cylindrical recess, shaped to receive a hollow generally semi-cylindrical bearing shell. The bearing shell typically comprises a backing layer that is provided with one or more layers on its concave inner surface, the innermost layer providing a running surface that faces the rotatable shaft.

The bearing shells in each bearing assembly may differ (e.g. having different materials or features), in which case it is preferred to ensure that the correct bearing shell is assembled into each of the housings (i.e. into the correct half of the bearing assembly). Alternatively, or additionally, bearing shells may be asymmetric along their circumference (for example if they are optimised for a particular direction of rotation of the shaft), in which case it is necessary to ensure that the bearing shells are assembled into the housing with the correct orientation. To ensure correct assembly of bearing shells into bearing housings, a bearing shell may be provided with an alignment feature, which projects outwardly from the convex outer surface of the bearing shell. The housing is provided with a corresponding alignment recess that receives the projecting alignment feature of the bearing shell.

Figure 1A:
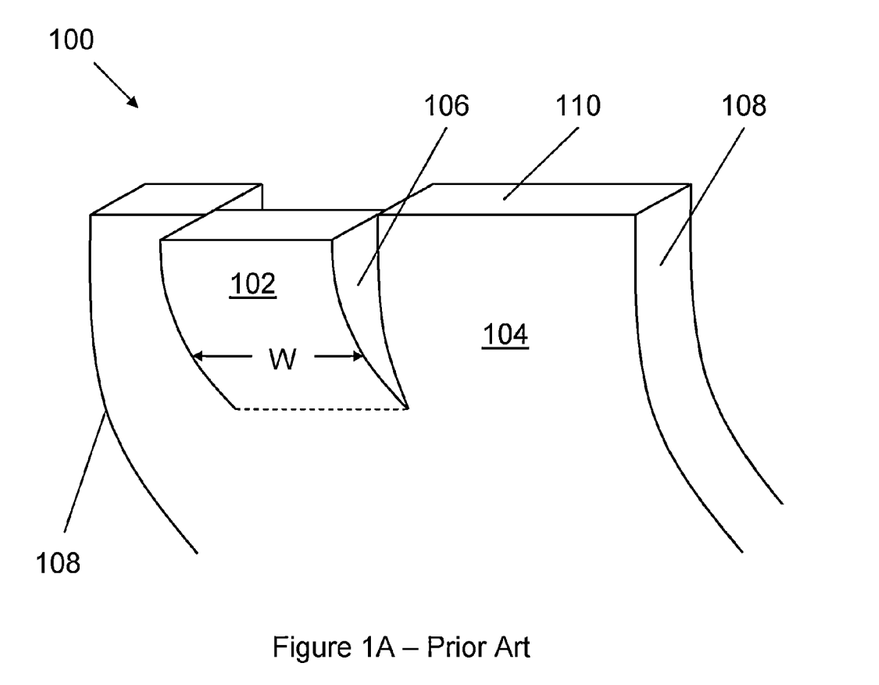
FIG. 1A shows a perspective view of a part of a bearing shell and alignment feature according to the prior art.
Figure 1B:
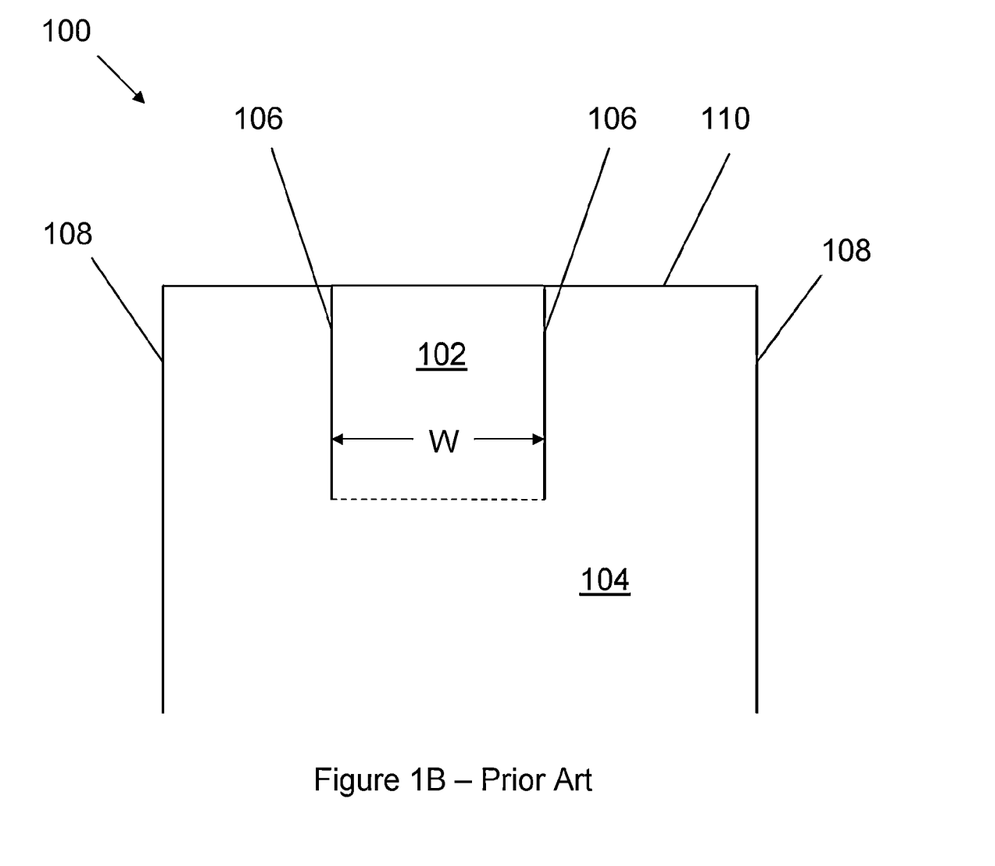
FIG. 1B shows a view of the alignment feature of Figure 1A perpendicular to the outer surface of the bearing shell.

FIGS. 1A and 1B illustrate a bearing shell 100 having a first type of alignment feature 102, which is manufactured by a first process, in which a narrow strip of material is pushed outwards (i.e. by being radially punched), with respect to the centre of curvature of the outer surface 104 of the bearing shell, into a die. The alignment feature 102 has parallel sides 106 parallel to the axial sides 108 of the bearing shell 100 (i.e. having constant axial width W, axial width being measured parallel with the axis of rotation of a shaft received into the bearing shell, and perpendicular to axial sides 108). The extent by which the alignment feature 102 projects from the convex outer surface of the bearing shell 100 tapers from a maximum projection level with the end face 110. For example, in the case that the bearing shell is approximately 20 mm wide (in the axial direction), and has a diameter of 60 mm, the alignment feature may be 3 mm wide, may project 1 to 2 mm from the convex outer surface of the bearing shell, and may extend approximately 5 mm around the circumference from the end face.

The alignment feature 102 in FIGS. 1A and 1B is shown closer to one axial side 108 than the other. However, it will be appreciated that the position of the alignment feature may be selected according to the individual requirements, and in some cases may be located equidistantly between the axial sides 108.

A second type of alignment feature is formed by a 'coining' process in which a punch is driven down onto an axially narrow, outer portion of an end face, which causes flow (i.e. deformation) of the punched material. Material flows out into a corresponding recess in a coining die supporting the bearing shell, and creates an alignment feature having the shape of a broad (i.e. along the axis of the bearing shell), outwardly projecting lip, that is slightly spaced apart from the end face. Any corresponding projection from the internal surface of the bearing shell should be avoided. An alignment feature of this second type, and a corresponding method of manufacture, is described in US2012027328A.

An alignment feature of either the first or second types provides a clear indication of the intended orientation of the bearing shell during assembly into a bearing housing (e.g. providing a visual indication to a worker during manual assembly, or providing a detectable indication of orientation during automated assembly), which provides a physical impediment to incorrect assembly. However, disadvantageously, such an alignment feature requires accurate axial alignment between the bearing shell and the bearing housing during assembly, which increases the complexity of assembly, and in particular reduces the reliability of automated assembly.

SUMMARY

A first aspect of the invention provides a bearing shell for a sliding bearing, the bearing shell having a convex outer surface and an alignment feature projecting from the outer surface adjacent an end face of the bearing shell, wherein the alignment feature comprises a first tapered portion having an axial width that reduces away from the end face, and each side of the first tapered portion is angled away from parallel with an axial end face of the bearing shell by an angle of 2° to 10°.

A second aspect of the invention comprises an engine comprising a housing and a bearing shell according to the first aspect, in which the bearing shell is received into a recess in the housing.

A third aspect of the invention provides a method of manufacturing a bearing shell for a sliding bearing, the bearing shell having a convex outer surface and an alignment feature projecting from the outer surface adjacent an end face of the bearing shell, wherein the alignment feature comprises a first tapered portion having an axial width that reduces away from the end face, and each side of the first tapered portion is angled away from parallel with an axial end face of the bearing shell by an angle of 2° to 10°, the method comprising:
providing a bearing shell or a flat blank for a bearing shell, and
forming the alignment feature.

Advantageously, such an alignment feature enables less complex and more reliable assembly of a bearing shell into a corresponding bearing housing. In particular such an alignment feature may provide wider axial alignment tolerances than for known alignment features, during assembly of the bearing shell into a corresponding bearing housing. Further, such an alignment feature may provide a degree of axial self-alignment of the bearing shell and bearing housing during assembly. Advantageously, angling each side of the first tapered portion away from parallel with an axial end face of the bearing shell by an angle of up to 10° provides an alignment feature that may be easily assembled into a corresponding recess of the housing.

Each side of the tapered portion may be angled away from parallel with an axial end face of the bearing shell by an angle of 3° to 7°. Each side of the tapered portion may be angled away from parallel with an axial end face of the bearing shell by an angle of substantially 5°.

The alignment feature may comprise a further portion proximal to the end face, and the first tapered portion distal to the end face. Advantageously, the provision of the further portion may strengthen the alignment feature.

The further portion may be a second tapered portion, having an axial width that reduces away from the end face, and wherein the first tapered portion has a greater taper than the second tapered portion. The axial width of the second tapered portion may taper such that each side of the first tapered portion is angled away from an axial end face of the bearing shell by less than 1°.

The further portion may have a constant axial width.

The first tapered portion may taper such that sides of the tapered portion do not meet. Advantageously, if the sides of the tapered portion do not meet, a stronger connection may be provided between the alignment feature and the main part of the bearing shell.

The first tapered portion may have a circumferential length of at least half its mean axial width, and preferably greater than its mean axial width. Advantageously, a longer circumferential length, for a given taper of the first tapered portion enables self-alignment for greater axial misalignment.

The alignment feature may project from the outer surface of the bearing shell by an extent that reduces away from the end face, along its circumferential length.

The alignment feature may extend circumferentially from substantially level with the end face of the bearing shell (i.e. the alignment feature may end substantially flush with an end face).

The alignment feature may be spaced apart circumferentially from the end face of the bearing shell. The alignment feature may be spaced apart from the end face by less than its greatest axial width.

The alignment feature may be formed by a process selected from the group comprising:
coining, embossing, and punching.

BRIEF DESCRIPTION OF THE DRAWINGS

Embodiments of the invention are further described hereinafter with reference to the accompanying drawings, in which.

DETAILED DESCRIPTION

Figure 2A:
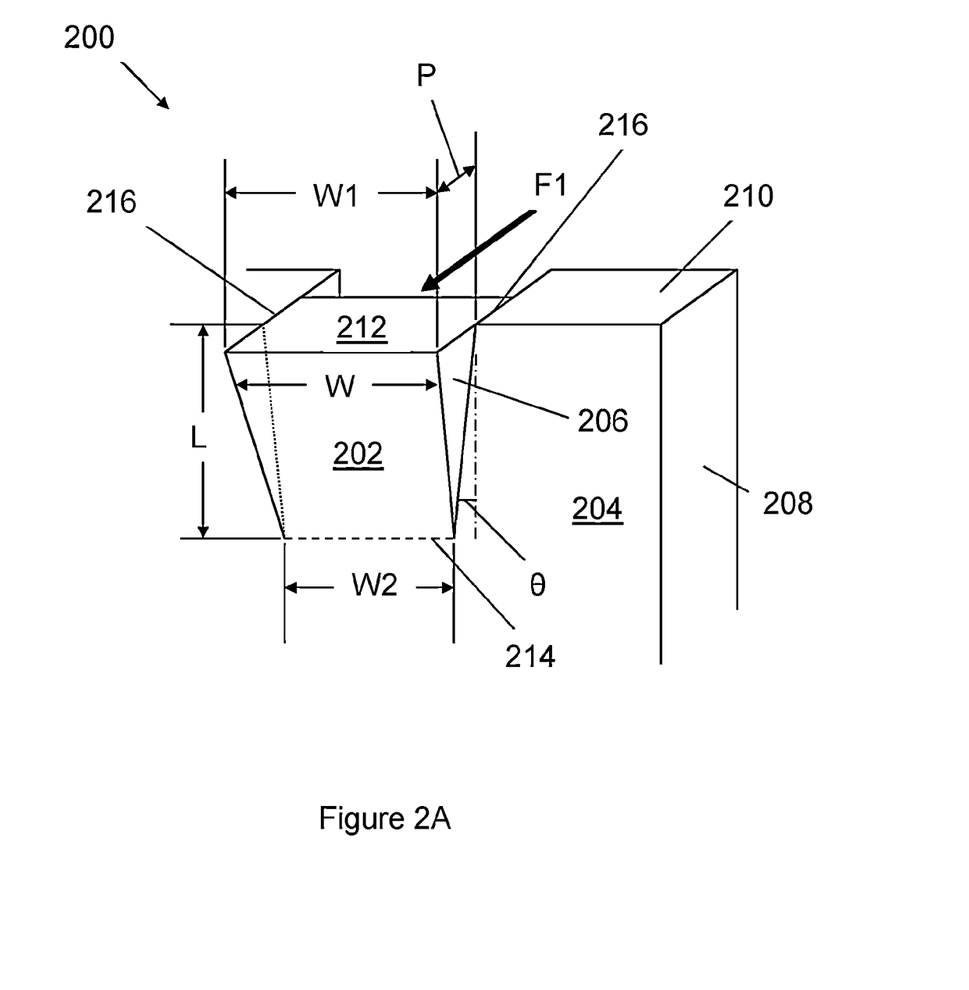
FIG. 2A shows a perspective view of part of a bearing shell and an alignment feature according to a first embodiment of the present invention.
Figure 2B:
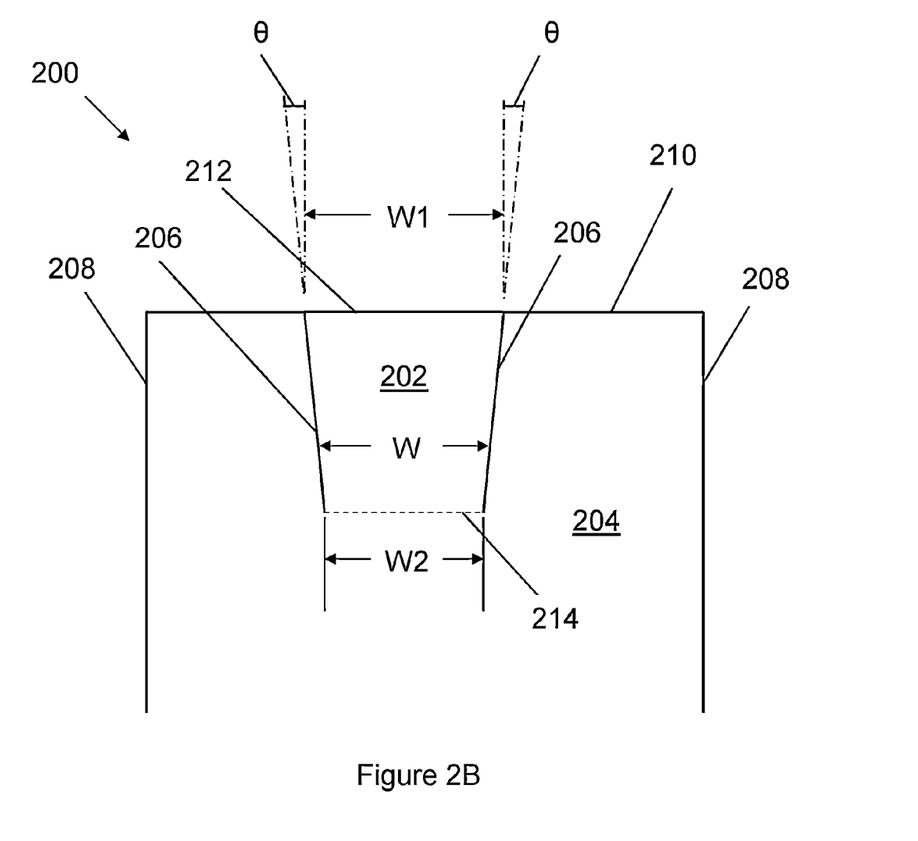
FIG. 2B shows a view of the alignment feature of FIG. 2A perpendicular to the outer surface of the bearing shell.

FIGS. 2A and 2B illustrate an end part of a bearing shell 200 according to a first embodiment of the present invention. The bearing shell 200 is generally hollow semi-cylindrical, and is provided with an alignment feature 202 that projects outwardly (i.e. radially) from the outer convex surface 204, projecting away from the centre of curvature of the bearing shell.

The alignment feature 202 has a tapered axial width W, having sides 206 that are each angled by an angle $\theta$ of 5° with respect to the corresponding axial sides 208 of the bearing shell 200. Alignment feature 202 has a first end 212 that is substantially level with the adjacent end face 210 of the bearing shell 200. The alignment feature 202 has a straight second end 214 furthest from the end face 210 of the bearing shell 200. The alignment feature tapers from W1 at the first end 212 adjacent to the end face 210 to W2 at the second end 214 furthest from the end face. The extent P by which the alignment feature 202 projects outwardly from the outer convex surface 204 of the bearing shell 200 is greatest at the first end 212 adjacent the end face 210 and tapers along the circumferential length L (i.e. perpendicular to the end face 210) of the alignment feature 202, reducing to zero at the opposite second end 214 of the alignment feature.

Figure 2C:
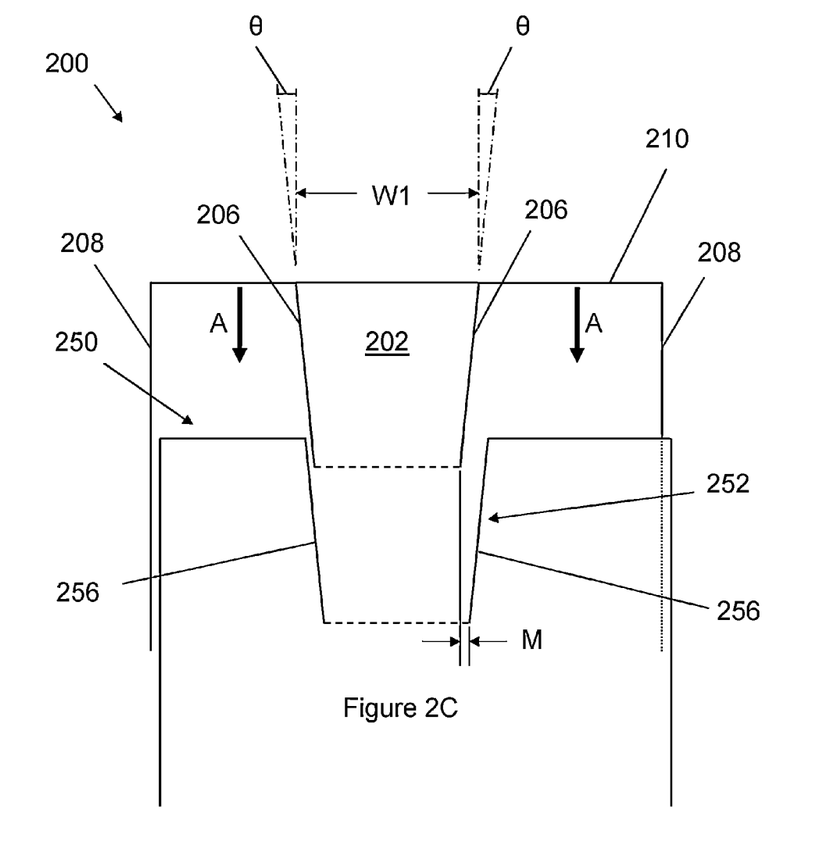
FIG. 2C shows the alignment feature of FIG. 28 being assembled into a corresponding housing.

FIG. 2C shows the relative positions of the partly assembled bearing shell 200 and housing 250, when the bearing shell is being inserted into the housing in the direction indicated by the arrows A. Advantageously, the alignment feature 202 of the present invention enables self-alignment between the bearing shell 200 and the housing 250, in the axial direction (i.e. perpendicular to the axial end faces 208, being the direction of the axis of rotation of a rotatable shaft received into the bearing shell). So, if there is relative axial misalignment M between the bearing shell 200 and the housing 250 as they are initially brought together, due to the mechanical interaction between the sides 206 of the alignment feature 202 and the sides 256 of the corresponding alignment recess 252 into which the alignment feature is received, the bearing shell and housing will become axially aligned once they are fully assembled.

In the embodiment illustrated in FIG. 2A, the extent by which the alignment feature 202 projects P from the outer convex surface 204 of the bearing shell 200 tapers to zero at the second end 214, furthest from the end face 210.

In the embodiment illustrated in FIGS. 2A and 2B, the alignment feature extends circumferentially from the first end 212 being substantially level (flush) with the end face 210. Such an alignment feature may be conveniently manufactured by an outward (radial) punching or embossing operation.

In the case of a punching process, a punch is driven against the concave inner surface of the bearing shell in the direction indicated by the arrow F1, whilst the convex outer surface 204 is supported by a die with a corresponding recess, into which the alignment feature is formed. The face of the punch is angled relative to the portion of the concave inner surface that it strikes, such that the first end 212 of the alignment features 202 projects outwardly from the convex outer surface by the greatest extent. A shear 216 is formed between the sides 206 of the alignment feature 202 and the main part of the bearing shell 200, whilst the alignment feature remains joined to the main part of the bearing shell at the second end 214, about which the alignment feature bends.

Figure 3A:
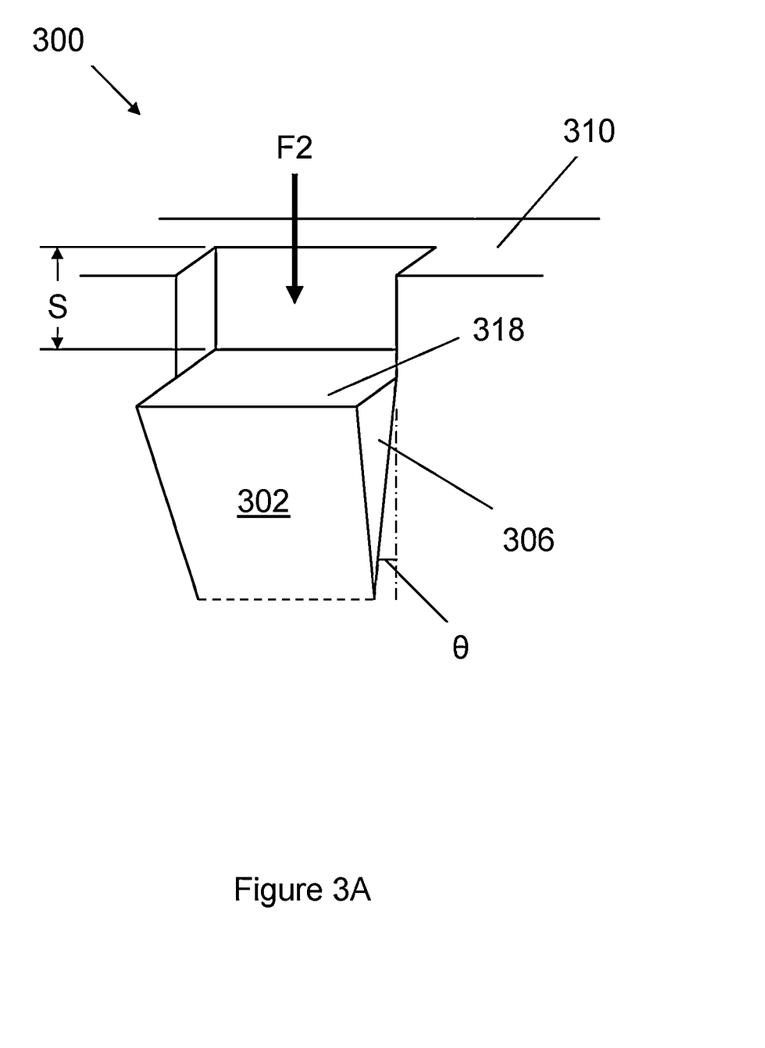
FIG. 3A shows a perspective view of a bearing shell and an alignment feature according to a third embodiment of the present invention.
Figure 3B:
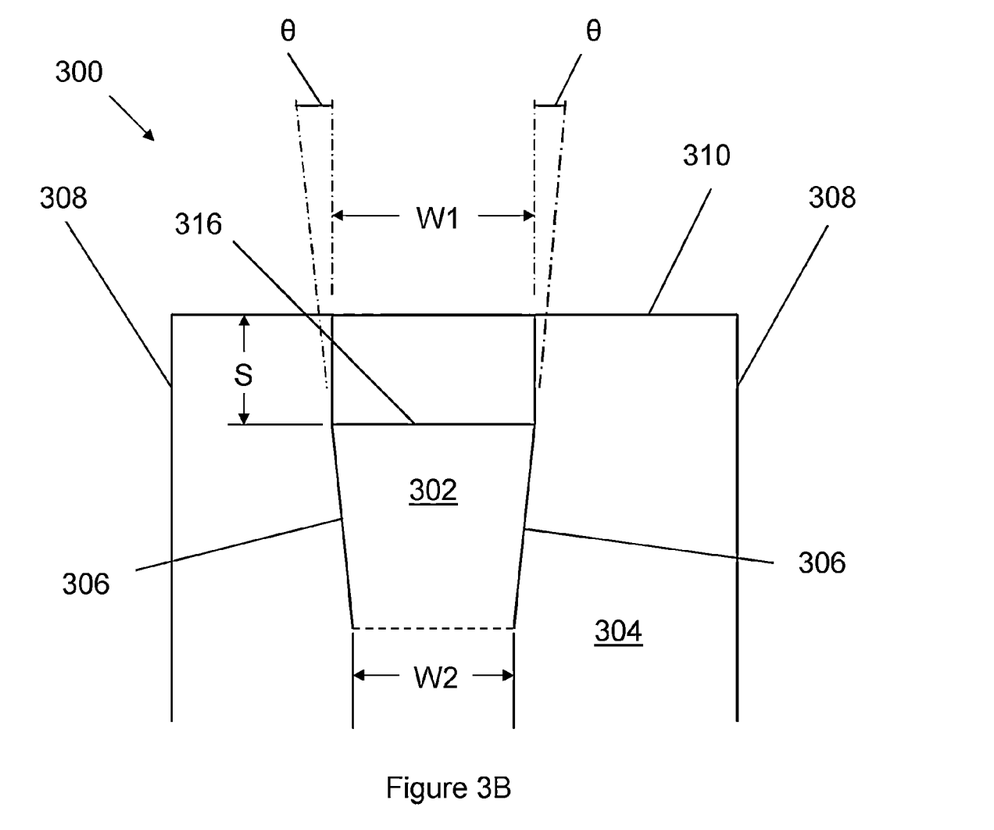
FIG. 3B shows a view of the alignment feature of FIG. 3A perpendicular to the outer surface of the bearing shell.

Alternatively, the end 318 of the alignment feature 302 may be slightly spaced apart S from the end face 410 of the bearing shell 300, as is illustrated in FIGS. 3A and 3B. Such an alignment feature 302 may conveniently be formed by a coining process, in which a coining punch is driven down in the direction of arrow F2 into the end face 310 of the bearing shell 300 to form the alignment feature 302. In this coining process, the bearing shell 300 is supported by a coining die having a corresponding recess, into which the material of the alignment feature 302 flows, as the coining punch is driven into the end face 310.

Figure 4A:
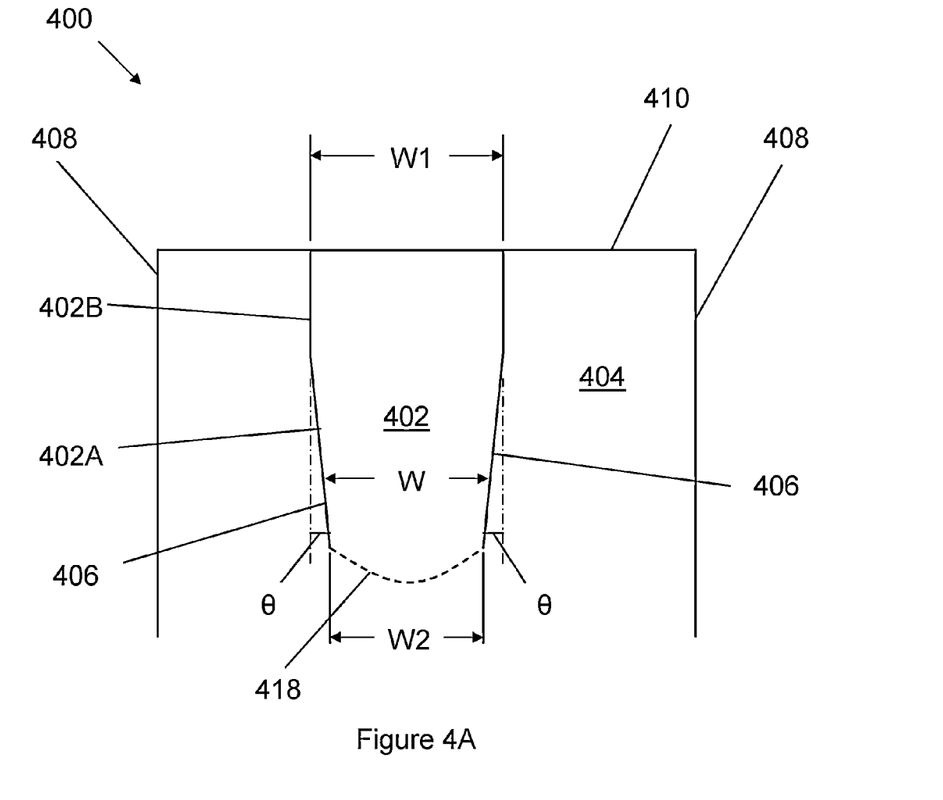
FIGS. 4A and 4B show alternative views of bearing shells of a further embodiment, viewed perpendicular to the outer surface of the bearing shell.
Figure 4B:
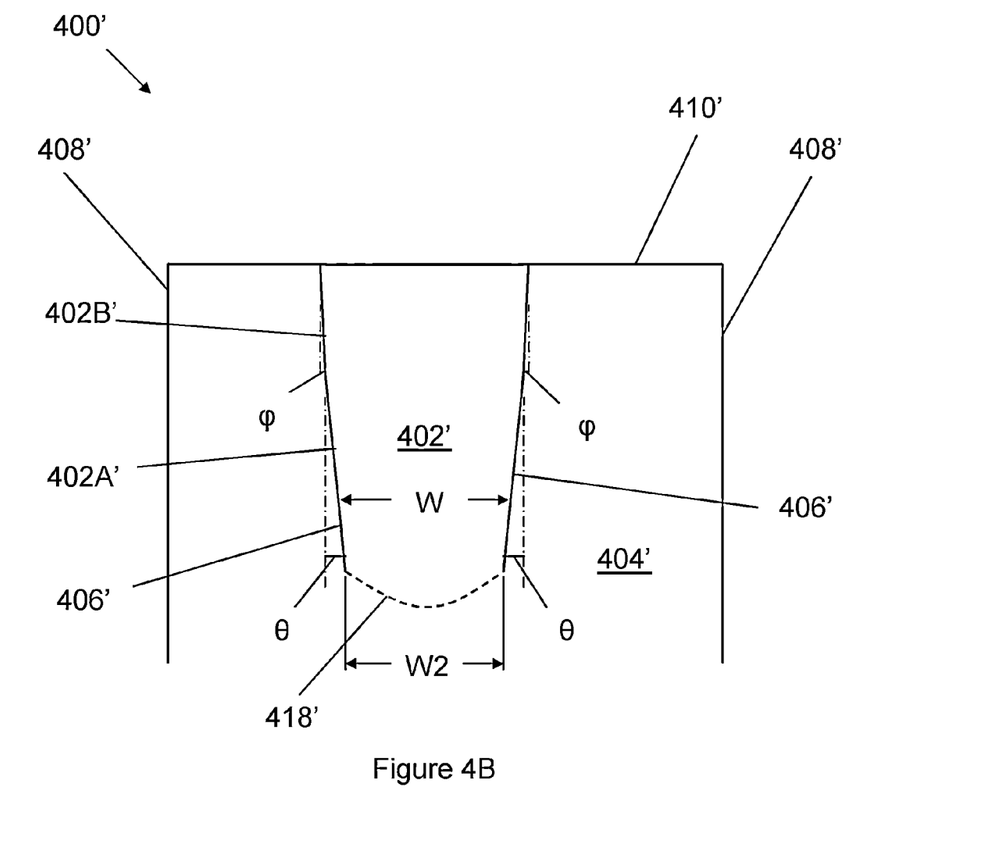

The alignment feature may have a plurality of sections along its circumferential length, in which the section further from the end face tapers by a greater amount than the section closer to the end face. As is illustrated in FIG. 4A, in one embodiment, the alignment feature section 402A furthest from the end face 410 tapers in axial width W in accordance with the present invention, and the alignment feature section 402B closest to the end face has a uniform axial width W1. Alternatively, as is illustrated in FIG. 4B, the alignment feature section 402B' closest to the end face 410' may taper in axial width, but by less than the alignment feature section 402A' furthest from the end face of the bearing shell 100 (i.e. $\phi<\theta$).

The figures provided herein are schematic and not to scale.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A bearing shell for a sliding bearing, comprising: a body having a convex outer surface and an alignment feature projecting from the outer surface, the alignment feature arranged at an end face of the body, wherein the alignment feature includes a first tapered portion having an axial width that reduces in a direction away from the end face, and wherein the first tapered portion includes at least two axial sides extending circumferentially and angled away from parallel with respect to a corresponding axial end face of the body by an angle of 2° to 10°.

2. The bearing shell according to claim 1, wherein the angle of at least one of the at least two axial sides of the first tapered portion is from 3° to 7°.

3. The bearing shell according to claim 1, wherein the alignment feature further includes:
   a further portion proximal to the end face, and
   wherein the first tapered portion is distal to the end face in relation to the further portion.

4. The bearing shell according to claim 3, wherein the further portion is a second tapered portion, the second tapered portion having an axial width that reduces in a direction away from the end face of the body, and wherein the first tapered portion has a greater taper in an axial direction than the second tapered portion.

5. The bearing shell according to claim 3, wherein the further portion has a constant axial width.

6. The bearing shell according to claim 1, wherein the first tapered portion tapers in the direction away from the end face such that the at least two axial sides of the first tapered portion are axially spaced from one another.

7. The bearing shell according to claim 1, wherein the first tapered portion has a circumferential length corresponding to at least half of a mean axial width defined by the first tapered portion.

8. The bearing shell according to claim 1, wherein the alignment feature projects from the outer surface an extent that reduces along a circumferential length of the alignment feature in the direction away from the end face.

9. The bearing shell according to claim 1, wherein the alignment feature extends circumferentially and defines an end face disposed substantially planar with the end face of the body.

10. The bearing shell according to claim 1, wherein the alignment feature is spaced apart circumferentially from the end face of the body.

11. An engine, comprising: a housing and a bearing shell disposed in a recess defined by the housing, wherein the bearing shell includes:
   a convex outer surface defined between at least two axial end faces and terminating at an end face;
   an alignment feature projecting from the outer surface at the end face and disposed axially spaced from the at least two axial end faces, wherein the alignment feature includes a first tapered portion defining an axial extent that reduces in a direction away from the end face, the first tapered portion including two converging axial sides that are angled away from parallel with respect to the at least two corresponding axial end faces by an angle of 2° to 10°.

12. A method of manufacturing a bearing shell for a sliding bearing, comprising:
   providing a body having a convex outer surface; and
   forming an alignment feature projecting from the outer surface at an end face of the body, wherein the alignment feature includes a first tapered portion having an axial width that reduces in a direction away from the end face, and wherein the first tapered portion includes at least two axial sides extending circumferentially and angled away from parallel with respect to a corresponding axial end face of the body by an angle of 2° to 10°.

13. The method according to claim 12, wherein forming the alignment feature includes at least one of a coining process, an embossing process, and a punching process.

14. The engine according to claim 11, wherein the alignment feature further includes a second tapered portion proximate to the end face in relation to the first tapered portion, the second tapered portion defining an axial extent that reduces in the direction away from the end face, and wherein the first tapered portion defines a greater taper in an axial direction than the second tapered portion.

15. The engine according to claim 11, wherein the alignment feature further includes a second portion proximate to the end face in relation to the first tapered portion, and wherein the second portion defines a constant axial extent.

16. The engine according to claim 11, wherein the first tapered portion defines a circumferential extent corresponding to at least half of a mean axial extent of the first tapered portion.

17. The engine according to claim 11, wherein the alignment feature projects a radial extent from the outer surface, wherein the radial extent reduces along a circumferential length in a direction away from the end face.

18. The engine according to claim 11, wherein the alignment feature is circumferentially spaced from the end face of the body.

19. The engine according to claim 11, wherein the angle of at least one of the axial sides of the first tapered portion is between 3° to 7°.

20. The engine according to claim 11, wherein the alignment feature extends circumferentially and defines an end face disposed substantially planar with the end face of the body.

* * * * *

UNITED STATES PATENT AND TRADEMARK OFFICE
CERTIFICATE OF CORRECTION

| | | |
|---|---|---|
| PATENT NO. | : 9,587,675 B2 | Page 1 of 1 |
| APPLICATION NO. | : 14/647124 | |
| DATED | : March 7, 2017 | |
| INVENTOR(S) | : Stephane Barral | |

It is certified that error appears in the above-identified patent and that said Letters Patent is hereby corrected as shown below:

On the Title Page

Item [73] Assignees, the third assignee listed is incorrectly spelled as "MAHLE COMPOSANT MOTEU FRANCE SAS" and should be deleted.

The correct spelling of the third assignee should read "MAHLE COMPOSANTS MOTEUR FRANCE SAS".

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*